United States Patent [19]
Watanabe et al.

[11] Patent Number: 5,892,645
[45] Date of Patent: Apr. 6, 1999

[54] PROTECTION SYSTEM FOR POWER RECEIVING STATION

[75] Inventors: Yoshiyasu Watanabe; Toru Tanimizu; Kazuo Kano, all of Hitachi; Yasunobu Kanou, Mito; Toshio Horikoshi, Fujioka; Koji Kondou, Narita; Ryutaro Yamamoto, Tokyo; Nobuhiro Kuroda, Yokohama, all of Japan

[73] Assignees: Hitachi, Ltd.; The Tokyo Electric Power Co., Inc., both of Tokyo, Japan

[21] Appl. No.: 902,528

[22] Filed: Jul. 29, 1997

[30] Foreign Application Priority Data

Aug. 1, 1996 [JP] Japan ................................. 8-203430

[51] Int. Cl.$^6$ .................................................. H02H 3/00
[52] U.S. Cl. .............................. 361/85; 361/93; 361/62; 361/115
[58] Field of Search ................................ 361/62, 64, 66, 361/78, 59, 115, 93, 85

[56] References Cited

U.S. PATENT DOCUMENTS 3,947,728  3/1976  Smith ........................................ 361/59
4,873,601  10/1989 Wakasa ..................................... 361/64

FOREIGN PATENT DOCUMENTS 7-68624  3/1995  Japan ............................... B29C 47/16

*Primary Examiner*—Jeffrey Gaffin
*Assistant Examiner*—Stephen Jackson
*Attorney, Agent, or Firm*—Fay, Sharpe, Beall, Fagan, Minnich & McKee

[57] ABSTRACT

A protection apparatus for a spot network substation has a plurality of receiving lines connected between a network bus and a plurality of power sources. Each receiving line is connected to a primary switching device, a network transformer and a protector CB. A detector for detecting a phase of each receiving line voltage and a judging unit for judging the detected phase are provided on the primary side of each network transformer. A previously stored basic phase is compared with the detected phase of the receiving line voltage. If there is a lag in the detected phase of the receiving line voltage, it is judged to be a power-stop of the corresponding power source and the protector CB is tripped.

15 Claims, 10 Drawing Sheets

PHASE DIFFERENCE BETWEEN $V_1$ & $V_2 = 360 \times \dfrac{T_1}{T_2}$ (DEGREE)

FIG. 12

| ACCIDENT CASE | ONE-PHASE (R-PHASE) EARTH FAILURE | TWO-PHASE (R-,S-PHASE) EARTH FAILURE | TWO-PHASE (R-,S-PHASE) SHORT CIRCUIT AND EARTH FAILURE | THREE-PHASE EARTH FAILURE |
|---|---|---|---|---|
| $V_1$ AND $V_2$ BEFORE ACCIDENT AND $V_1$ IN ACCIDENT (FIG. 11) | | $V_S$ $V_R$ $V_T$ | | |
| $V_2$ AFTER ACCIDENT (AFTER OPENING FEEDER CB 12) | $V_S$ $V_R$ $V_T$ | $V_S$ $V_R$ $V_T$ | $V_S$ $V_R$ $V_T$ | $V_S$ $V_R$ $V_T$ |
| VOLTAGE CHANGE (FIG. 11) | EARTH FAILURE PHASE: LOWERED  OTHER PHASE: RAISED | SHORT CIRCUIT PHASE: LOWERED  OTHER PHASE: NO CHANGE | SHORT CIRCUIT PHASE: LOWERED  OTHER PHASE: RAISED | ALL PHASES LOWERED |

PROTECTION SYSTEM FOR POWER RECEIVING STATION

BACKGROUND OF THE INVENTION

The present invention relates to a protection apparatus for use with a spot network substation or a main/sub 2-line receiving substation, and more particularly to a protection apparatus for a substation having a circuit capable of generating a reverse power flow to a power source at an electric power company.

A spot network substation is well known in which reverse power flow is generated. Since power supply reliability is very high, the spot network substation is widely used for building substations. As disclosed in Japanese Patent Application Laid-open No. JP-A-7-68624, in a conventional protection system for a spot network substation, a plurality of receiving lines are connected between three-phase and three-line power sources and a network bus connected to circuit breakers (CB's) for supplying power to an air conditioner, an elevator, and the like. Each of the plurality of receiving lines is connected to a primary switching device, a network transformer, a protector CB and a current transformer in succession. For example, the current transformer detects reverse energizing current upon energization of the network transformer by the network bus when a power source is stopped. This detected reverse energizing current causes a network relay connected to the current transformer to judge a presence of a reverse power flow state, i.e., a power-stop of the power source and trip the protector CB to protect the spot network substation. This system is collectively called a spot network protector.

In this spot network substation, in order to deal with an emergency when power supply from power sources is stopped because of some accident, an emergency generator is connected to one end of the network bus to supply power to an emergency facility only when power supply to all the receiving facilities is stopped. Recently, demands for efficient use of facilities have become intense and switching to a co-generation system as an uninterrupted generator has been desired.

Various types of power sources such as spot network power sources and main/sub 2-line power sources have been used recently depending upon power user requirements. These various types of power sources are required to be managed collectively because of demands for efficient use of power sources. Furthermore, in order to improve reliability of power supply of spot network power sources over a conventional system, for example, some three-line spot network power sources supply power from different transformers and different substations. Collective management of these power sources with different transformers generates a voltage difference between power sources.

However, the spot network protector for a spot network substation has a reverse power tripping function as described above. If a generator connected to a power line is operated, current flowing from the network bus connected to the generator through the power source causes to trip the protector CB. Therefore, this system is difficult to use if the generator is to be operated at high efficiency such as in the case of a co-generation system. Furthermore, an emergency generator cannot be switched unless a full power-off is effected which is therefore inevitable.

If the voltages of power sources become unstable, voltages between a plurality of receiving lines of the spot network substation become different. Therefore, power is supplied from a high voltage receiving line to a low voltage receiving line, and a reverse power tripping function operates at the low voltage receiving line so that the spot network substation cannot operate normally.

If another substation such as a main/sub 2-line receiving substation is connected to spot network power sources and a generator connected to a power line is used, there is no reverse power tripping function. In this case, therefore, power is transmitted to a stopped spot network power source. As described above, currently used protection units cannot collectively manage spot network power sources, main/sub 2-line receiving power sources, and the like, in terms of operation safety and reliability.

SUMMARY OF THE INVENTION

The present invention provides a protection apparatus capable of configuring a system which allows a combined use of not only a spot network substation connectable to a co-generation system and a spot network substation connected to spot network power sources but also a main/sub 2-line receiving substation.

According to the present invention, the protection apparatus of this invention pays attention to two phenomena, one being that the phase of a load side of a transformer lags from that of a power source side because of characteristics of energizing, and the other being that the voltage phase does not lag even during reverse power supply if a feeding circuit breaker at an electric power company is not opened. As a unit capable of judging the direction of power by detecting a voltage phase, a detector for detecting a voltage phase at each receiving line and a judging unit for judging the detected phase are provided on the primary side of a transformer of each receiving line. The operation conditions of the detector and judging unit are uniquely determined in this invention.

BRIEF DESCRIPTION OF THE DRAWINGS

FIG. 12 is a diagram showing vectors and voltage changes under various types of accidents of the substation shown in FIG. 11.

DESCRIPTION OF THE PREFERRED EMBODIMENTS

Figure 1:
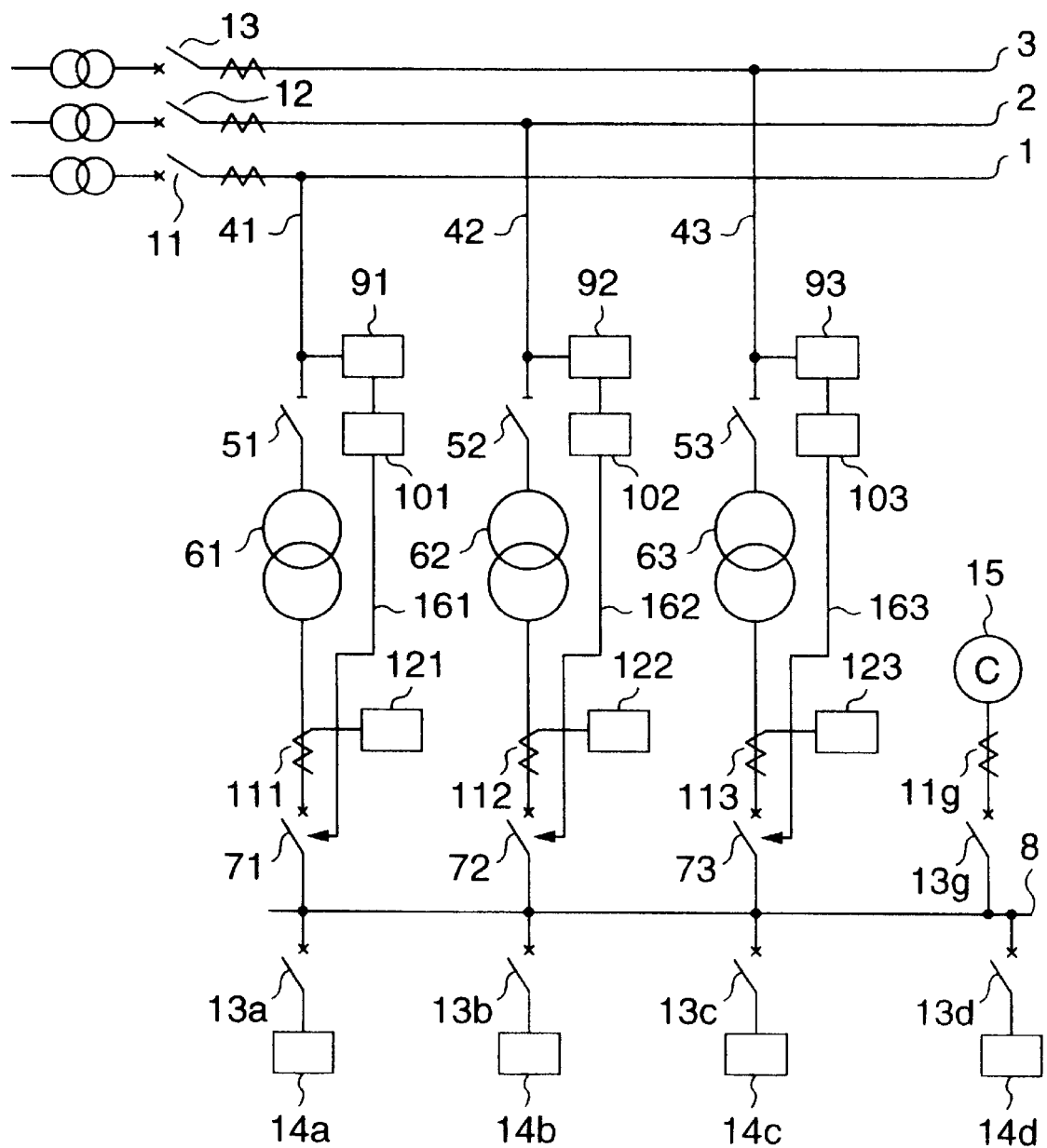
FIG. 1 is a single line diagram showing a spot network substation protection apparatus of a stored phase comparison type according to an embodiment of the invention.

An embodiment of the invention will be described with reference to FIG. 1. Power sources 1, 2 and 3 of an electric power company are provided with power circuit breakers (CB) 11, 12 and 13 for the control of power supply and power protection. One of the ends of receiving lines 41, 42 and 43 of a spot network substation are connected to the power sources 1, 2 and 3, and the other ends thereof are sequentially connected to primary switching devices 51, 52 and 53, network transformers 61, 62 and 63, and protector CB's 71, 72 and 73, and finally to a network bus 8. Loads 14*a*, 14*b* and 14*c* are connected via CB's 13*a*, 13*b* and 13*c* to the network bus 8 for the reception of power. A power generator 15 is connected via a CB 13*g* to the network bus 8. Detectors 91, 92 and 93 and judging units 101, 102 and 103 characteristic to this invention are connected to the receiving lines 41, 42 and 43. The detectors 91, 92 and 93 each detect a voltage of each phase, and the judging units 101, 102 and 103 each process the detected phase and judge a power-stop at each power source. If each judging unit 101, 102, 103 judges a power-stop at the receiving end of each corresponding receiving line 41, 42, 43, it sends a trip command 161, 162, 163 to each corresponding protector CB 71, 72, 73. Each detector 91, 92, 93 detects the voltage of each corresponding receiving line 41, 42, 43 by using a voltage divider made of resistors, capacitances of dielectric substances or capacitors, a potential transformer or the like. Specifically, it detects the phase of zero voltage level crossing of the detected voltage with a precision of an electrical angle of 1 degree or smaller of the power frequency. Each judging unit 101, 102, 103 stores the zero voltage level crossing phase detected by each detector 91, 92, 93, and compares the newly detected phase with the already stored phase one period before. If the newly detected phase lagged from the phase one period before by an angle or larger in the range from 1 to 15 degrees set by a setting unit provided in the judging unit 101, 102, 103, and continues for a time or longer in the range from 0.15 to 1 second, then it judges that a power-stop of the corresponding power source has occurred, and sends a trip command to the corresponding protector CB so that reverse energizing from the network bus 8 to the suspended power source can be stopped.

Another embodiment shown in FIG. 2 will be described. Instead of the judging units 101, 102 and 103 provided for the respective receiving lines 41, 42 and 43 in the structure shown in FIG. 1, this embodiment uses a single judging unit 10 which can collectively process the voltages detected by the detecting units 91, 92 and 93 at the receiving lines 41, 42 and 43. If the judging unit 10 judges a power-stop at any one receiving point of the receiving lines 41, 42 and 43, it sends a corresponding one of trip commands 161, 162 and 163 to the corresponding one of the protector CB's 71, 72 and 73 connected to the receiving lines 41, 42 and 43. Specifically, the judging unit 10 compares phases of zero voltage level crossing detected by the detectors 91, 92 and 93 and if one of the phases lagged from another phase by an angle or larger in the range from 1 to 15 degrees set by the setting unit provided in the judging unit 10, continues for a time or longer in the range from 0.15 to 1 second, then it judges that a power-stop of the corresponding power source connected to the judging unit which detected the delayed phase has occurred, and sends a trip command to the corresponding protector CB so that reverse energizing from the network bus 8 to the suspended power source can be stopped.

Another embodiment shown in FIG. 3 will be described. In addition to the structure shown in FIG. 1, detectors 94, 95 and 96 are provided for detecting secondary voltages of the network transformers 61, 62 and 63. The detectors 91, 92 and 93 connected to the same receiving lines 41, 42 and 43 as the detectors 94, 95 and 96 detect primary voltages of the network transformers 61, 62 and 63. If the phase angle between the primary and secondary voltages lagged by an angle or larger in the range from 1 to 15 degrees set by the setting unit provided in the judging unit 10, continues for a time or longer in the range from 0.15 to 1 second, then the corresponding one of the judging units 101, 102 and 103 judges that a power-stop of the corresponding power source connected to this judging unit has occurred, and sends a trip command to the corresponding protector CB so that reverse energizing from the network bus 8 to the suspended power source can be stopped.

Figure 4:
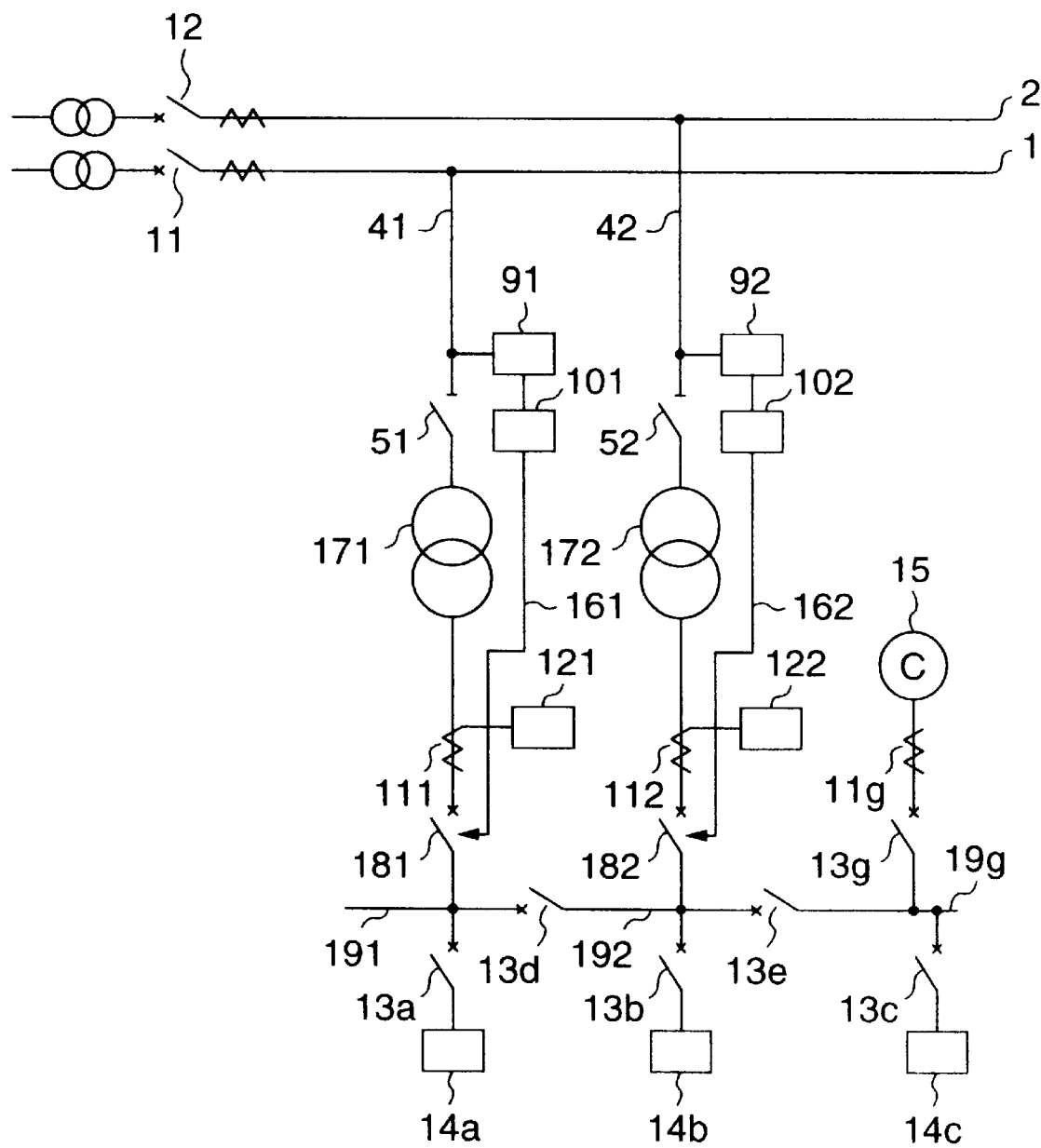
FIG. 4 is a single line diagram showing a main/sub 2-line receiving substation protection apparatus of a stored phase comparison type according to an embodiment of the invention.

Another embodiment of the invention will be described with reference to FIG. 4. Power sources 1 and 2 of an electric power company are provided with power CB's 11 and 12 for the control of power supply and power protection. One ends of receiving lines 41 and 42 of a main/sub 2-line receiving substation are connected to the power sources 1 and 2, and the other ends thereof are sequentially connected to primary switching devices 51 and 52, transformers 171 and 172, and secondary CB's 181 and 182, and finally to feeding buses 191, 192 and 19*g*. A load 14*a* is connected via a CB 13*a* to the feeding bus 191, a load 14*b* is connected via a CB 13*b* to the feeding bus 192, and a load 14*c* is connected via a CB 13*c* to the feeding bus 19*g*, respectively for the reception of power. A power generator 15 is connected via a CB 13*g* to the feeding bus 19*g*. Detectors 91 and 92 and judging units 101 and 102 characteristic to this invention are connected to the receiving lines 41 and 42. The detectors 91 and 92 each detect a voltage of each phase, and the judging units 101 and 102 each process the detected phase and judge a power-stop at each power source. If each judging unit 101, 102 judges a power-stop at the receiving end of each corresponding receiving line 41, 42, it sends a trip command 161, 162 to each corresponding secondary CB 181, 182 connected to the receiving line 41, 42. Each detector 91, 92 detects the voltage of each corresponding receiving line 41, 42 by using a voltage divider made of resistors, capacitances of dielectric substances or capacitors, a potential transformer or the like. Specifically, it detects the phase of zero voltage level crossing of the detected voltage with a precision of an electrical angle of 1 degree or smaller of the power frequency. Each judging unit 101, 102 stores the zero voltage level crossing phase detected by each detector 91, 92, and compares the newly detected phase with the already stored phase one period before. If the newly detected phase lagged from the phase one period before by an angle or larger in the range from 1 to 15 degrees set by a setting unit provided in the judging unit 101, 102, continues for a time or longer in the range from 0.15 to 1 second, then it judges that a power-stop of the corresponding power source has occurred, and sends a trip command to the corresponding secondary CB so that reverse energizing from the generator 15 via the feeding buses 191, 192, 19*g* to the suspended power source can be stopped.

Figure 5:
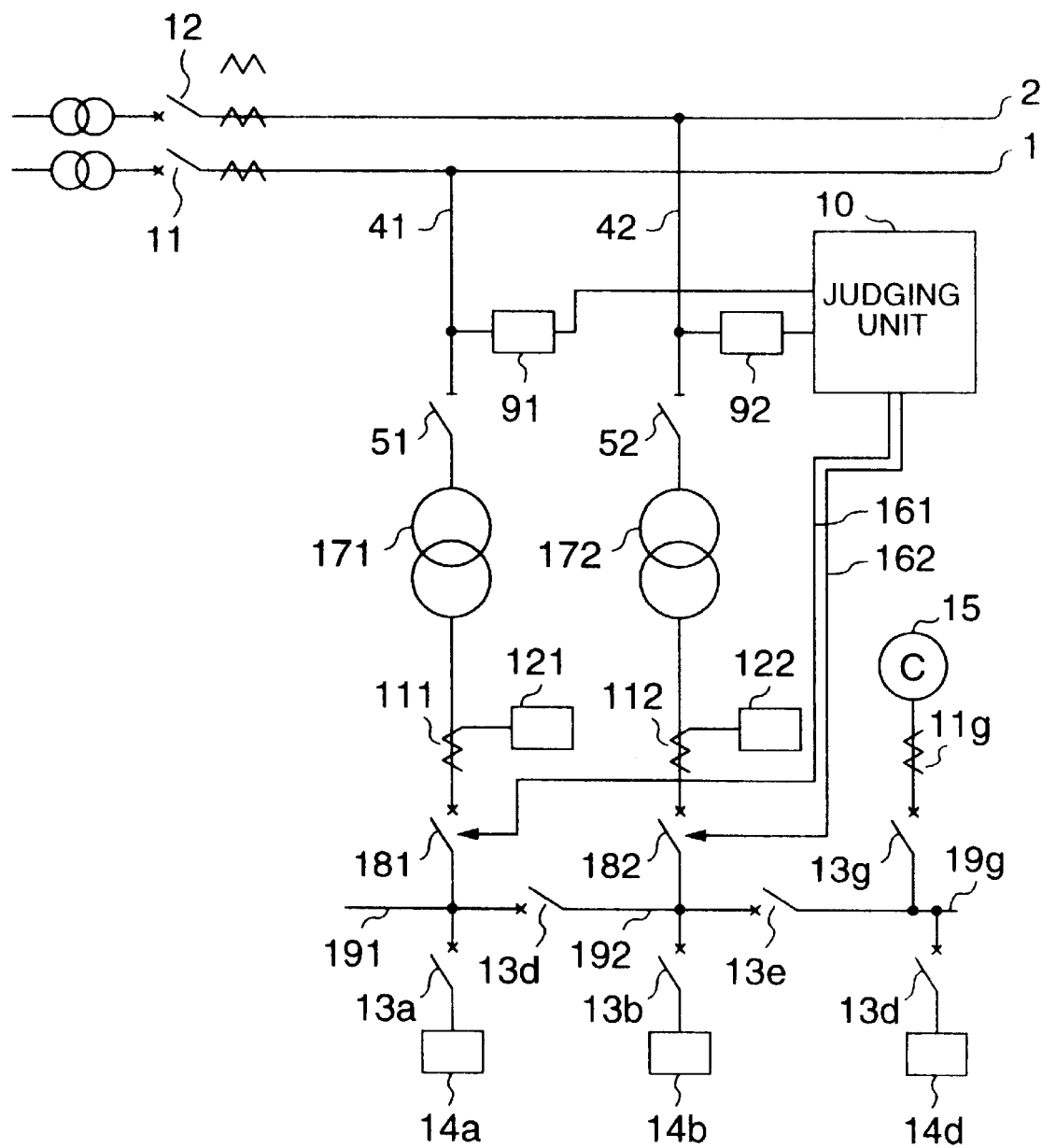
FIG. 5 is a single line diagram showing a main/sub 2-line receiving substation protection apparatus of a receiving inter-line phase comparison type according to an embodiment of the invention.

Another embodiment shown in FIG. 5 will be described. Instead of the judging units 101 and 102 provided for the respective receiving lines 41 and 42 in the structure shown in FIG. 4, this embodiment uses a single judging unit 10 which can collectively process the voltages detected by the detecting units 91 and 92 at the receiving lines 41 and 42. If the judging unit 10 judges a power-stop at any one receiving point of the receiving lines 41 and 42, it sends a corresponding one of trip commands 161 and 162 to the corresponding one of the secondary CB's 181 and 182 connected to the receiving lines 41 and 42. Specifically, the judging unit 10 compares phases of zero voltage level crossing detected by the detectors 91 and 92 and if one of the phases lagged from another phase by an angle or larger in the range from 1 to 15 degrees set by the setting unit provided in the judging unit 10, continues for a time or longer in the range from 0.15 to 1 second, then it judges that a power-stop of the corresponding power source connected to the judging unit which detected the delayed phase has occurred, and sends a trip command to the corresponding secondary CB so that reverse energizing from the generator 15 via the feeding buses 191, 192 and 19g to the suspended power source can be stopped.

Figure 6:
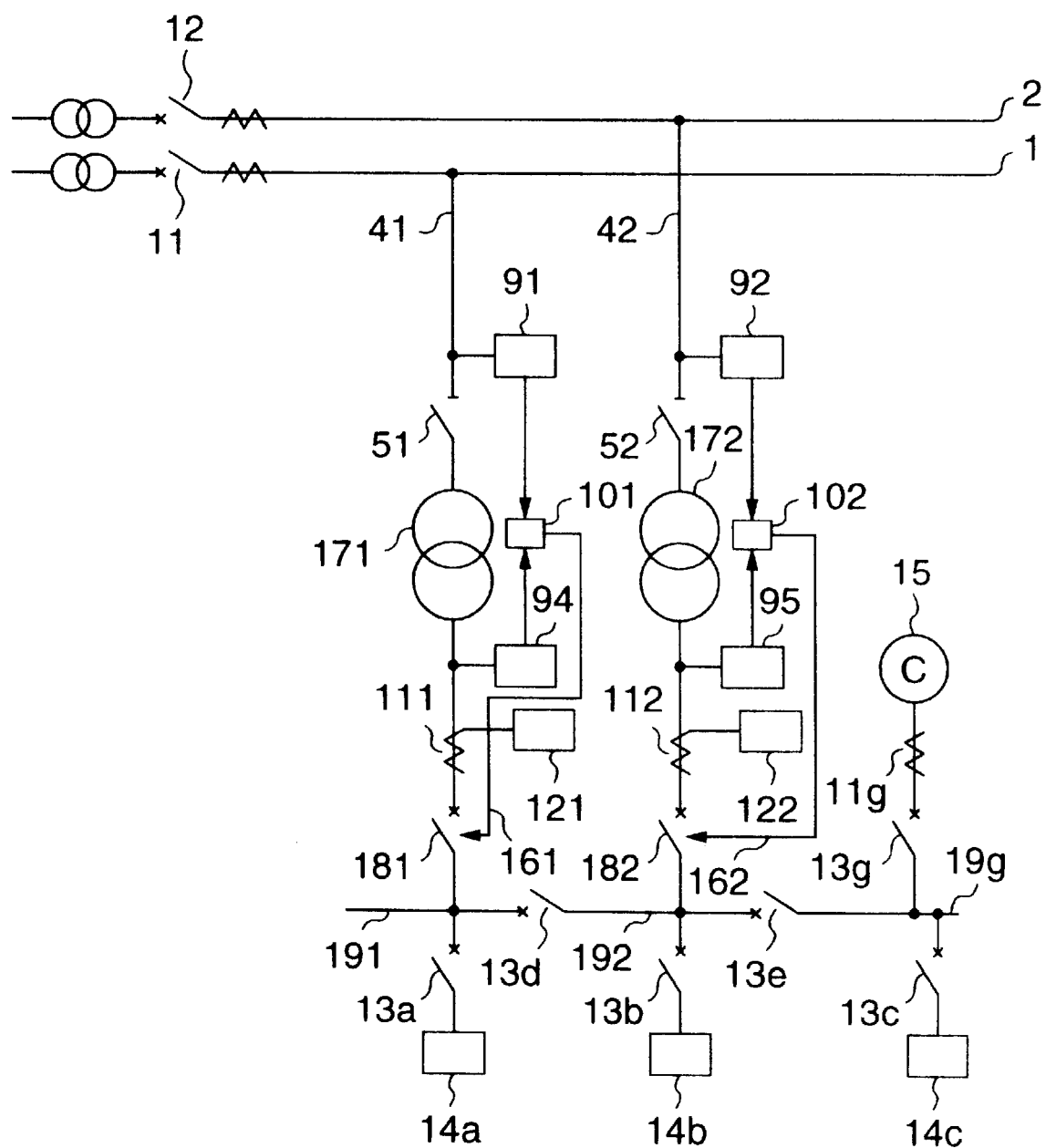
FIG. 6 is a single line diagram showing a main/sub 2-line receiving substation protection apparatus of a transformer primary/secondary phase comparison type according to an embodiment of the invention.

Another embodiment shown in FIG. 6 will be described. In addition to the structure shown in FIG. 4, detectors 94 and 95 are provided for detecting secondary voltages of the transformers 171 and 172. The detectors 91 and 92 connected to the same receiving lines 41 and 42 as the detectors 94 and 95 detect primary voltages of the transformers 171 and 172. If the phase angle between the primary and secondary voltages lagged by an angle or larger in the range from 1 to 15 degrees set by the setting unit provided in the judging unit 10, continues for a time or longer in the range from 0.15 to 1 second, then the corresponding one of the judging units 101 and 102 judges that a power-stop of the corresponding power source connected to this judging unit has occurred, and sends a trip command to the corresponding secondary CB so that reverse energizing from the generator 15 via the feeding bus 191, 192, 19g to the suspended power source can be stopped.

Figure 7:
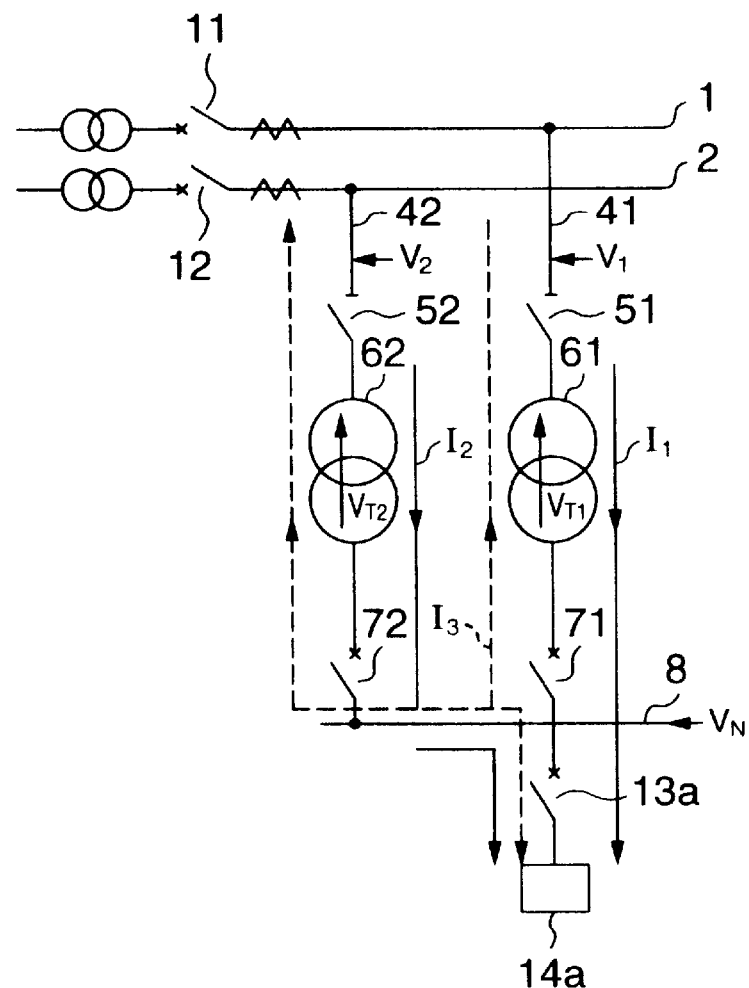
FIG. 7 is a single line diagram showing the direction of current/voltage according to an embodiment of the invention.
Figure 8:
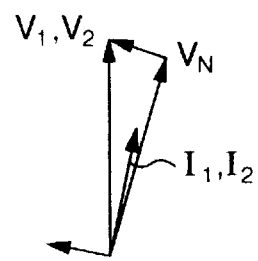
FIG. 8 is a vector diagram for the unit shown in FIG. 7 without a stopped power source.
Figure 9:
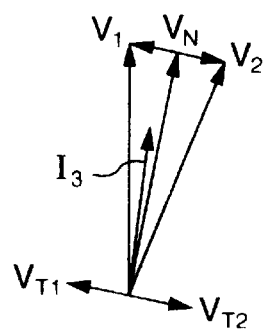
FIG. 9 is a vector diagram for the unit shown in FIG. 7 with a stopped power source.

With reference to FIGS. 7 to 9, a change in the voltage vector will be described for the case where there is no power-stop of the power sources and for the case where one of a plurality of power sources is stopped. As shown in FIG. 7, if there is no power-stop of the power sources, currents indicated at I1 and I2 flow from the power sources 1 and 2 and via network transformers 61 and 62 through a load 14a. If a feeder CB 12 at an electric power company is opened and the power source 2 is stopped, current indicated at I3 flows from the power source 1 and via the network transformer 61 through the load 14a, and the network transformer 62 is reversely energized so that the power source 2 is also reversely energized. FIG. 8 is a schematic diagram showing a phase relationship between voltage vectors V1 and V2 at receiving lines 41 and 42 and a voltage vector Vnw at a network bus 8 respectively of one phase when there is no power-stop of the power sources. In FIG. 8, if both the feeder CB's 11 and 12 at the electric power company are closed, the voltage vectors V1 and V2 at the receiving lines 41 and 42 are generally equal, and the internal voltage drops Vt1 and Vt2 at the network transformers 61 and 62 caused by characteristics of energizing are also generally equal as shown in FIG. 8. The voltage vector Vnw at the network bus 8 is a difference between the voltage vectors V1 and V2 at the receiving lines 41 and 42 and the internal voltage drops Vt1 and Vt2 at the network transformers 61 and 62. Therefore, as shown in FIG. 8, the voltage vector Vnw has a phase lagged from the voltage vectors V1 and V2 at the receiving lines 41 and 42. FIG. 9 is a schematic diagram showing a phase relationship between the voltage vectors V1 and V2 at the receiving lines 41 and 42 and the voltage vector Vnw at the network bus 8 respectively of one phase when the feeder CB 12 at the electric power company is opened and the power source 2 is stopped. In FIG. 9, the internal voltage drops Vt1 and Vt2 at the network transformers 61 and 62 caused by the current vector I3 have generally opposite phases as shown. The voltage vector Vnw at the network bus 8 is a difference between the voltage vector V1 and V2 at the receiving line 41 and the internal voltage drop Vt1 at the network transformers 61. Therefore, the voltage vector Vnw has a phase lagged from the voltage vector V1 at the receiving line 41. The voltage vector V2 at the receiving line 42 is a sum of the voltage vector Vnw and the internal voltage drop Vt1 at the network transformer 61. Therefore, as shown in FIG. 9, the voltage vector V2 has a phase lagged further from the voltage vector Vnw. This lagged phase has been confirmed to be in the range from 1 to 15 degrees according to analysis of various cases made by computers.

Figure 10:
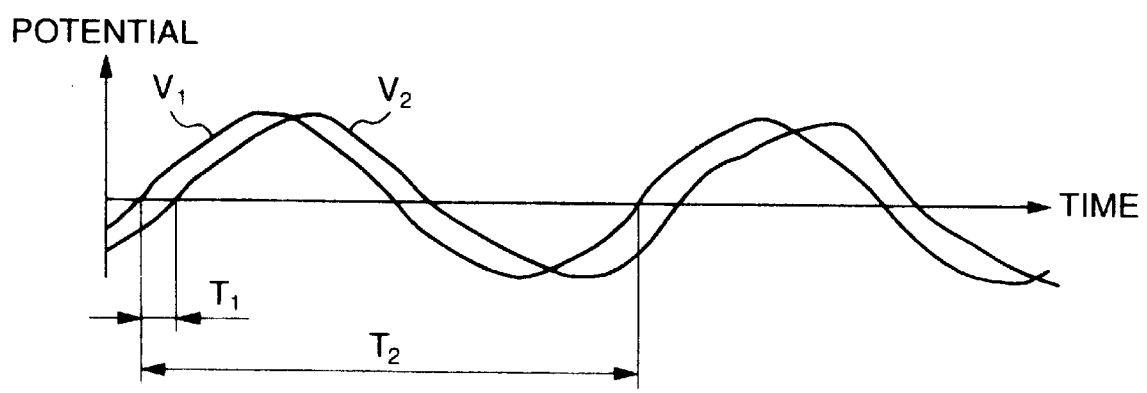
FIG. 10 is a waveform diagram showing a voltage phase difference in the unit shown in FIG. 7.

A specific approach of how the phase judging units 101, 102 and 103 detect a phase difference between two or more voltages with changed phases or phase differences in accordance with the principle described above, will be described with reference to FIG. 10. FIG. 10 illustrates an example of detecting a phase difference between the voltage vectors V1 and V2 at the receiving lines 41 and 42. The phase difference is calculated from the equation shown in FIG. 10 by using a time difference T1 between zero voltage level crossing points of the voltage waveforms V1 and V2 and a period T2 of voltages V1 and V2.

In the above description, attention has been paid to a change in the voltage phase caused by a power-stop of a power source. If there is any failure in a power source, not only a phase but also a voltage value changes. A change in the three-phase voltage vector at the receiving line 41, 42 will be described with reference to FIG. 12 for the case wherein a short circuit or an earth fault has occurred on the power source 2 and the feeder CB 12 at the electric power company has tripped. As shown, the voltage vectors V1 and V2 at the receiving lines 41 and 42 before power accident and the voltage vector V1 at the receiving line 41 after the power accident has occurred and the feeder CB 12 has opened, show a normal state for all three phases. The voltage vector V2 at the receiving line 42 after the power accident has occurred and the feeder CB 12 has opened, show various changes depending upon the kind of power accidents as shown in FIG. 12. As seen from the relationship between the accident contents and a voltage change, an earth voltage of a non-earth fault phase rises for one- and two-phase earth faults, and an earth voltage of a short circuit phase lowers for a two- and three-phase short circuits. From the above facts, a function of detecting an accident on a power source from a voltage value change can be realized by adding a voltage value detecting function to the detectors 91, 92 and 93 for detecting a voltage phase at the receiving lines 41, 42 and 43 and adding a voltage change function to the phase judging units 101, 102 and 103.

The structure of the embodiments has been described above.

Next, the operation and effects of the receiving protection unit shown in FIG. 1 will be described. During the operation while the feeder CB's 11, 12 and 13 are closed, the voltage phase at the power source 1, 2, 3 detected by the detector 91, 92, 93 is in a phase lag or phase lead smaller than one degree. The judging unit 101, 102 and 103 connected to each detector stores this voltage phase as a zero voltage level crossing phase. If the feeder CB 13 is opened in this state, the network transformer 63 is reversely energized via the network bus 8 and the power source 3 is also reversely energized. At this time, as described with reference to FIGS. 7 to 9, the voltage phase at the power source 3 lags by 1 to 15 degrees from the voltage phase immediately before the feeder CB 13 is opened. The judging unit 103 then compares zero voltage level crossing phase input from the detector 93 with the presently stored zero voltage level crossing phase, and calculates a phase lag by calculating a phase difference by the calculation method illustrated in FIG. 10 to thereby judge whether the power source 3 has been stopped. If it is judged that the power source has been stopped, the judging unit 103 sends a trip command 163 to the protector CB 73 to prevent reverse energizing of the power source 3 from the network bus 8. If an inter-bus potential difference among the power sources 1, 2 and 3 becomes large because of the supply of different transformers by an electric power company or other reasons, a conventional system supplies electric power from a high voltage bus to a low voltage bus and the protector CB connected to the bus to which electric power is supplied enters the conditions of tripping for reverse power flow. In contrast, according to the present invention, a power-stop is judged not from the direction of power flow but from the voltage phase difference. Therefore, if the feeder CB's 11, 12 and 13 are not opened, any delay of the voltage vectors at the power sources 1, 2 and 3 does not occur so that unnecessary cut-off of the protector CB's 71, 72 and 73 does not occur and pumping does not occur when an automatic close function is used in combination. If the generator 15 connected to the network bus 8 is operated and reverse power is generated from the generator 15 to the power sources 1, 2 and 3 because of the fluctuation of loads or the like, the protector CB's 71, 72 and 73 are not opened from the same reasons described above so that the generator 15 can be operated at a high efficiency and power supply can be made. Since the detectors 91, 92 and 93 and judging units 101, 102 and 103 are provided separately for each receiving line 41, 42, 43, maintenance work does not make the device at another line during power reception operate erroneously.

Next, the operation and effects of the protection apparatus shown in FIG. 2 will be described. As different from the unit shown in FIG. 1, the judging unit 10 compares the phases of voltages at the receiving lines 41, 42 and 43 so that zero voltage level crossing phase before one period is not necessary to be stored and the judging unit can be simplified. The other operation and effects are the same as the unit of FIG. 1.

Next, the operation and effects of the protection apparatus shown in FIG. 3 will be described. The operation of the unit shown in FIG. 3 is basically the same as that of FIG. 2. In this unit, instead of using a voltage phase difference between the receiving lines 41, 42 and 43, the phase difference between the primary and secondary phases of each network transformer 61, 62, 63 is used for the judgement of power-stop. Therefore, this unit is applicable even to two lines among the receiving lines 41, 42 and 43. The operation and effects after the judgement of power-stop are the same as the unit shown in FIG. 1.

Next, the operation and effects of the protection apparatus shown in FIG. 4 will be described. Power is received from the power source 1 via the transformer 171. The generator 15 is operated being connected with a power line. In this steady state, the judging unit 101 stores a zero voltage level crossing phase of a voltage at the power source 1 detected by the detector 91. In this state, if the feeder CB 11 at an electric power company is opened, the power source 1 is reversely energized from the generator 15 via the feeding buses 191, 192 and 19g. At this time, as described with reference to FIGS. 7 to 9, the voltage phase of the power source 1 has a lag of 1 to 15 degrees relative to the voltage phase of the generator 15 and the voltage phase of the power source 1. The judging unit 101 then compares the zero voltage level crossing phase input from the detector 91 with the presently stored zero voltage level crossing phase, and calculates a phase lag by calculating a phase difference by the calculation method illustrated in FIG. 10 to thereby judge whether the power source 1 has been stopped. If it is judged that the power source has been stopped, the judging unit 101 sends a trip command 161 to the secondary CB 181 of the corresponding transformer to prevent reverse energizing of the power source 1 from the generator 15 via the feeding lines 191, 192 and 19g. Reverse energizing of the stopped power source can thus be prevented. Therefore, adverse effects upon substations of other power consumers such as a spot network substation connected to the same power source can be avoided and any malfunction to be caused by power source maintenance work by an electric power company can be avoided. Even if the power sources 1 and 2 are not stopped and power supply from the generator 15 to the power sources 1 and 2 occurs because of an abrupt decrease of loads, the phase change does not occur at the power sources 1 and 2 and secondary CB's are not unnecessarily closed. As a result, the generator 15 can be operated at a high efficiency and power supply can be made. Further even if regenerative electric power is generated from elevators or the like under a low load state, the phase change of the power sources 1 and 2 does not occur similar to the case wherein the generator supplies power to the power sources 1 and 2. Therefore, the secondary CB's 181 and 182 are not unnecessarily cut and stable power supply to loads becomes possible.

Next, the operation and effects of the protection apparatus shown in FIG. 5 will be described. Power is received from the power source 1 via the transformer 171. The generator 15 is operated being connected with a power line. In this steady state, the judging unit 101 monitors a phase difference by comparing zero voltage level crossing phases of voltages at the power sources 1 and 2 detected by the detectors 91 and 92. In this steady state, the feeder CB's 11 and 12 at the electric power company are closed so that there is no phase difference between the power sources 1 and 2. The phase of an output voltage of the generator 15 is shown as the network bus voltage Vnw in FIG. 8. Namely, this phase is a phase lag relative to the power sources 1 and 2. If the feeder CB 11 at the electric power company is opened in this state, the power source 1 is reversely energized from the generator 15 via the feeding lines 191, 192 and 19g. At this time, as described with reference to FIG. 9, the voltage phase of the power source 1 is a phase lag relative to the output voltage phase of the generator 15. Therefore, the judging unit 10 detects that the voltage phase of the power source 1 is a phase lag relative to that of the power source 2 and judges that the power source 1 has stopped. The operation and effects after the power-stop judgement are the same as the unit shown in FIG. 4.

Next, the operation and effects of the protection apparatus shown in FIG. 6 will be described. The operation of the unit shown in FIG. 6 is basically the same as that of FIG. 5. In this unit, instead of using a voltage phase difference between the power sources 1 and 2, the phase difference between the primary and secondary phases of each transformer 171, 172 is used for the judgement of power-stop. Therefore, this unit is applicable even to one line among the two receiving lines 41 and 42. The operation and effects after the judgement of power-stop are the same as the unit shown in FIG. 5.

Next, the operation and effects of the phase difference detection method using zero voltage level crossing phases of power source voltages illustrated in FIG. 10 will be described. The judgement method using the phase and direction of current is likely to be affected by a power factor of load, a load capacity and a harmonic content. To avoid this, high quality current transformers and potential transformers have been used. However, the judgement method using the phase of a primary voltage of a transformer is less affected by such external disturbances and so the detected waveform is less affected. Therefore, the performance required for the detection unit can be made less severe. Specifically, a conventional allowance is 1% or less, whereas an allowance of about 20% is possible so that cost can be reduced greatly.

Figure 11:
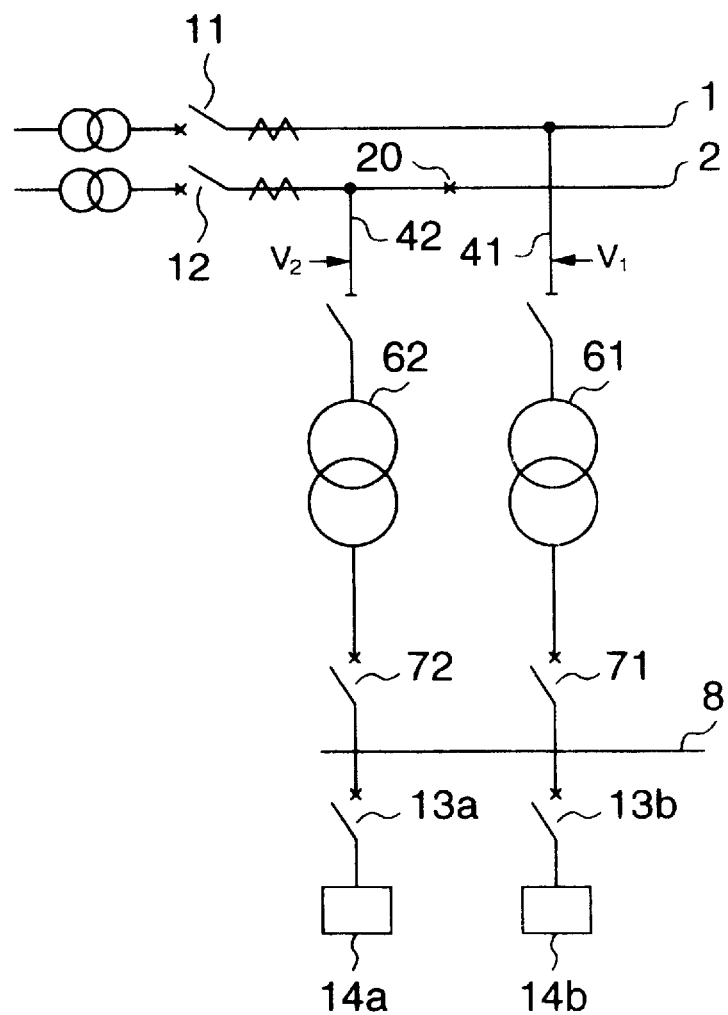
FIG. 11 is a single line diagram showing a substation according to an embodiment of the invention.

Next, the operation and effects of the judgement method using a change in the power source voltage illustrated in FIGS. 11 and 12 will be described. There are two cases of a power-stop of the power source 1, 2 or 3. One case occurs when the feeder CB 11, 12 or 13 is opened by an electric power company for maintenance purpose. The other case occurs when the feeder CB 11, 12 or 13 is isolated by the receiving protection unit because of occurrence of an accident at the power source 1, 2 or 3. In the case of a power-stop for the maintenance, the voltage values of the power sources 1, 2 and 3 scarcely changes so that it is necessary to perform judgement based upon a phase difference. In the case of the power-stop of the power source 1, 2 or 3 by an accident, for example in a case that an earth failure or short circuit failure arises at the point a in the system shown in FIG. 11, voltage values of the power sources 1, 2 and 3 change greatly as shown in FIG. 12. This voltage change does not appear at the secondary side of the transformers 61 to 63 and 171 to 172 so that it is necessary to provide the difference judgement to provide voltage detectors 91 to 93 at the power sources 1, 2 and 3. By adding phase comparison as well as voltage value comparison in the above manner, detection range can be broadened and detection reliability can be improved.

The operation and effects of setting a time, required for the judging units 101 to 103 and 10 shown in FIGS. 1 to 6 to start detecting a phase difference and output the trip commands 161 to 163 to the CB's 71 to 73 and 181 to 182, longer than an operation time of the feeder CB's 11 to 13 at the electric power company, will be described with reference to FIG. 1. The power sources 1, 2 and 3 are interconnected by unrepresented interconnection CB's installed in a substation of the electric power company. Therefore, after an accident occurs at one power source, e.g., power source 1, current flows from the other power sources 2 and 3 to the accident point until the feeder CB 11 at the electric power company is opened. The voltage phases of the other power sources are pulled by the accident power source 1 and temporarily take abnormal values although in very short time. In view of this, the time required for the judging units 101 to 103 and 10 to start detecting a phase difference and output the trip commands 161 to 163 to the CB's 71 to 73 and 181 to 182, is therefore set longer than an operation time of the feeder CB's 11 to 13 at the electric power company. In this manner, the judgement can be performed under the conditions that the normal power sources 2 and 3 are not affected by the accident, and erroneous operations of the judging units 101 to 103 and 10 can be avoided. More specifically, the operation time of the feeder CB's is set to 0.12 seconds or shorter, and an allowance time of short time durable current is 1 second. Therefore, the set time for the judging units 101 to 103 and 10 is required to be 0.15 to 1 second for ensuring normal operation.

Figure 2:
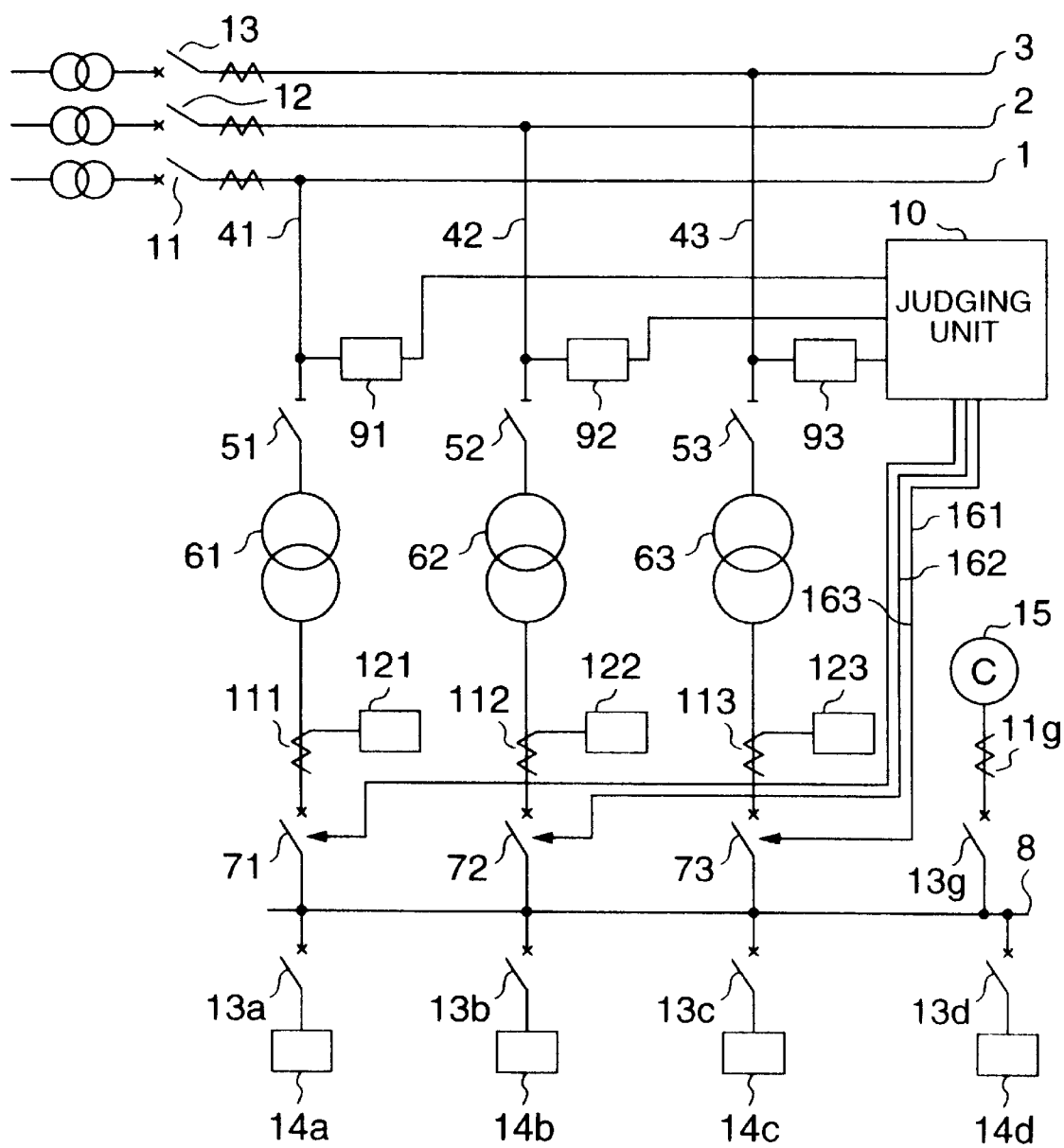
FIG. 2 is a single line diagram showing a spot network substation protection apparatus of a receiving inter-line phase comparison type according to an embodiment of the invention.
Figure 3:
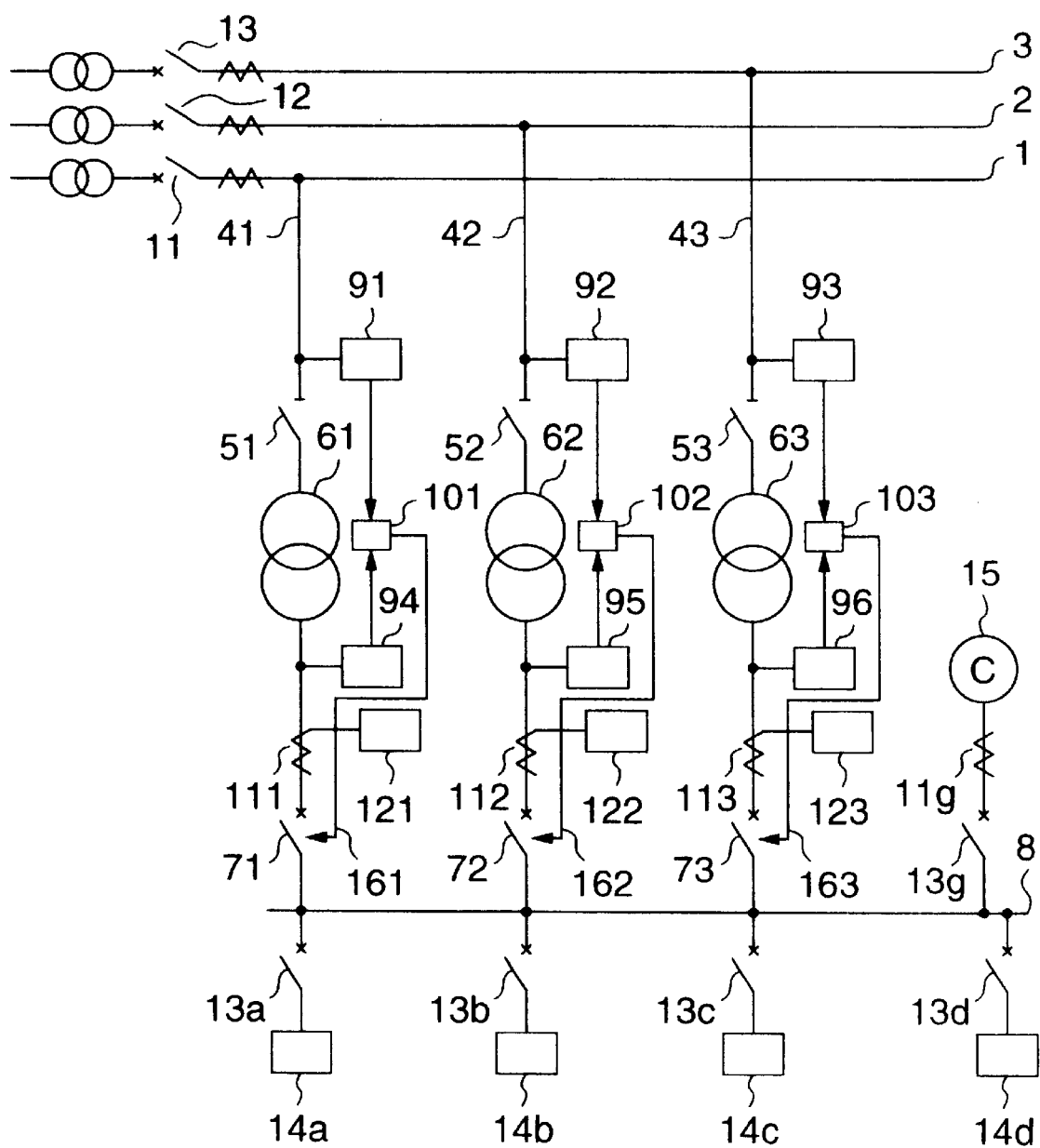
FIG. 3 is a single line diagram showing a spot network substation protection apparatus of a transformer primary/secondary phase comparison type according to an embodiment of the invention.

In FIGS. 1 to 3, if the judging units 101 to 103 and 10 operate and overcurrent relays 121 to 123 connected to current transformers 111 to 113 at the secondary side of the network transformers 61 to 63 do not operate, then only the protector CB's 71 to 73 are tripped. Whereas if the overcurrent relays 121 to 123 operate, then after the protector CB's 71 to 73 are tripped, the primary switching devices 51 to 53 are opened. These operations can reliably prevent reverse energizing of the network transformers 61 to 63 to be caused by the network bus 8 via stray capacity between electrodes of the protector CB's 71 to 73 when any accident occurs at the power sources 1, 2 and 3. A work of removing the accident power source can therefore be performed safely. In the case of a power-stop to be caused by other than an accident, without opening the primary switching devices 51 to 53, only the protector CB's 71 to 73 are closed when the power source 1, 2 or 3 recovers to thereafter receive electric power. Power supply reliability can therefore be improved.

In FIGS. 1 to 3, the protector CB's 71 to 73 are automatically closed if the state that the receiving lines 41 to 43 have no phase lag difference during an automatic operation, continues longer than a re-close time of the feeder CB's at the electric power company and exceeds a time set in the range from 2 to 20 seconds. This operation allows the protector CB's 71 to 73 to be closed without delay when the power-stop of the power sources 1, 2 and 3 is released by closing the feeder CB's 11, 12 and 13 at the electric power company, and allows a load per one network transformer 61, 62, 63 to be reduced. Therefore, a lifetime of the network transformers 61 to 63 can be prolonged and leveling of the network transformers 61 to 63 becomes possible.

As described so far, although the power-stop of a power source has been judged conventionally from the direction and phase of current, the power-stop of a power source is judged in this invention from a voltage phase difference of a power source, particularly from a phase lag state, by utilizing the fact that the voltage phase difference lags only upon occurrence of a power-stop of a power source. Therefore, even if current flows between power sources because of voltage difference, unnecessary circuit disconnection through CB tripping is not made and power can be reliably supplied to a load. Furthermore, even if reverse power flows from a generator to a power source, there is no phase delay. Therefore, even a spot network substation can use a generator connected to a power line. Still further, a main/sub 2-line receiving substation can be used in combination.

Since the voltage phase difference is detected through zero voltage level crossing in this invention, judgement and protection can be made reliably without being affected by external disturbances having a large influence mainly upon current, such as a load power factor, a load capacity, high frequency and the like.

What is claimed is:

1. A protection apparatus for a spot network substation having a plurality of receiving lines connected between a network bus and a plurality of power sources, each receiving line being connected to a primary switching device, a network transformer and a protector circuit breaker, wherein a detector for detecting a phase of each receiving line voltage and a judging unit for judging the detected phase are provided on a primary side of each network transformer, an already stored basic phase is compared with the detected phase of the receiving line voltage, and if there is a lag in the detected phase of the receiving line voltage, it is judged to be a power-stop of the corresponding power source and the protector circuit breaker is tripped.

2. A protection apparatus for a spot network substation having a plurality of receiving lines connected between a network bus and a plurality of power sources, each receiving line being connected to a primary switching device, a network transformer and a protector circuit breaker, wherein a detector for detecting a phase of each receiving line voltage and a judging unit for judging the detected phase are provided on a primary side of each network transformer, phases of the plurality of receiving lines are compared, and if there is a lag, the receiving line with the changed phase is judged that the corresponding power source is in a power-stop state and the protector circuit breaker is tripped.

3. A protection apparatus for a spot network substation having a plurality of receiving lines connected between a network bus and a plurality of power sources, each receiving line being connected to a primary switching device, a network transformer and a protector circuit breaker, wherein detectors for detecting phases of receiving line voltages are provided on primary and secondary sides of each network transformer, a judging unit for judging the detected phase is provided, phases on the primary and secondary sides of each network transformer are compared, and if there is a phase lag on the primary side, it is judged that the corresponding power source is in a power-stop state and the protector circuit breaker is tripped.

4. A protection apparatus for a substation having a generator connected with a power line and a receiving line connected to a switching device, a transformer and a secondary circuit breaker, wherein a detector for detecting a phase of a receiving line voltage and a judging unit for judging the detected phase are provided on a primary side of the transformer, an already stored basic phase is compared with the detected phase of the receiving line voltage, and if there is a lag in the detected phase of the receiving line voltage, it is judged to be a power-stop of a power source and the secondary circuit breaker is tripped.

5. A protection apparatus for a substation having a generator connected with a power line and a plurality of receiving lines each connected to a switching device, a transformer and a secondary circuit breaker, wherein a detector for detecting a phase of each receiving line voltage and a judging unit for judging the detected phase are provided on a primary side of each transformer, phases of the plurality of receiving lines are compared, and if there is a lag, the receiving line with the changed phase is judged that a corresponding power source is in a power-stop state and the second circuit breaker is tripped.

6. A protection apparatus unit for a substation having a generator connected with a power line and a plurality of receiving lines each connected to a switching device, a transformer and a second circuit breaker, wherein detectors for detecting phases of receiving line voltages are provided on primary and secondary sides of each transformer, a judging unit for judging the detected phase is provided, phases on the primary and secondary sides of each transformer are compared, and if there is a phase lag on the primary side, it is judged that a corresponding power source is in a power-stop state and the secondary circuit breaker is tripped.

7. A protection apparatus according to claim 1, wherein the phase delay difference is judged based on a lag of 1 to 15 degrees on the receiving side or power source side.

8. A protection apparatus according to claim 1, wherein the phases are compared by detecting times when each voltage crosses a zero voltage level.

9. A protection apparatus according to claim 1, wherein the phase delay difference is judged based on both phase comparison and voltage comparison.

10. A protection apparatus according to claim 9, wherein if any one phase lowers to an earth potential, it is judged to be an occurrence of an earth failure, whereas if two or three phases lower voltages, it is judged to be an occurrence of a short circuit of a power line.

11. A protection apparatus according to claim 1, wherein a time from an occurrence of a phase difference to tripping of circuit breaker is set longer than an operation time of a feeder circuit breaker of an electric power company.

12. A protection apparatus according to claim 11, wherein a time from an occurrence of a phase difference to tripping of circuit breaker is set in the range from 0.15 to 1 second.

13. A protection apparatus according to claim 1, wherein if an overcurrent relay connected to a secondary current transformer of the network transformer does not operate, only the protector circuit breaker is tripped, whereas if the overcurrent relay operates, after the protector circuit breaker is tripped, a primary switching device is opened.

14. A protection apparatus according to claim 1, wherein if there are phase differences at all receiving lines whose circuit breakers are closed, it is judged that there is regenerative power from an elevator or the like or a power supply from the generator connected to a power line, and the circuit breaker is not tripped.

15. A protection apparatus according to claim 1, wherein the protector circuit breaker is automatically closed if the state that the receiving line has no phase lag difference during an automatic operation, continues longer than a re-close time of a feeder circuit breaker and exceeds a time set in the range of 2 to 20 seconds.

* * * * *